United States Patent [19]

Sinclair

[11] Patent Number: 5,301,549

[45] Date of Patent: Apr. 12, 1994

[54] LIQUID-LEVEL GAUGING

[75] Inventor: David Sinclair, Chineham, England

[73] Assignee: Smiths Industries Public Limited Company, London, England

[21] Appl. No.: 21,465

[22] Filed: Feb. 23, 1993

[30] Foreign Application Priority Data

Mar. 10, 1992 [GB] United Kingdom ................. 9205148

[51] Int. Cl.⁵ .............................................. G01F 23/28
[52] U.S. Cl. ................................. 73/290 V; 340/621; 367/908
[58] Field of Search ...................... 73/290 V; 340/621

[56] References Cited

U.S. PATENT DOCUMENTS

| | | | |
|---|---|---|---|
| 2,990,543 | 6/1961 | Rod | 73/290 V |
| 4,063,457 | 12/1977 | Zekulin et al. | 73/290 V |
| 4,183,007 | 1/1980 | Baird | 73/290 V |
| 4,748,846 | 6/1988 | Haynes | 73/290 V |
| 4,896,535 | 1/1990 | Duckart et al. | 73/290 V |
| 5,095,747 | 3/1992 | Smith | 340/621 |
| 5,095,748 | 3/1992 | Gregory et al. | 73/290 V |

Primary Examiner—Daniel M. Yasich
Attorney, Agent, or Firm—Pollock, Vande Sande and Priddy

[57] ABSTRACT

An ultrasonic liquid level sensor has a transducer mounted at the lower end of an aluminum tube that projects upwardly in a liquid tank so that the tube is filled with liquid to the same height as that outside the tube. Internally, the tube has a layer of an acoustically-absorbing plastics to damp the transmission of ultrasonic vibration from the wall of the tube into liquid within the tube.

10 Claims, 1 Drawing Sheet

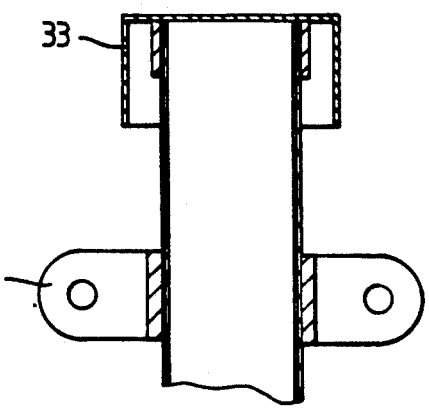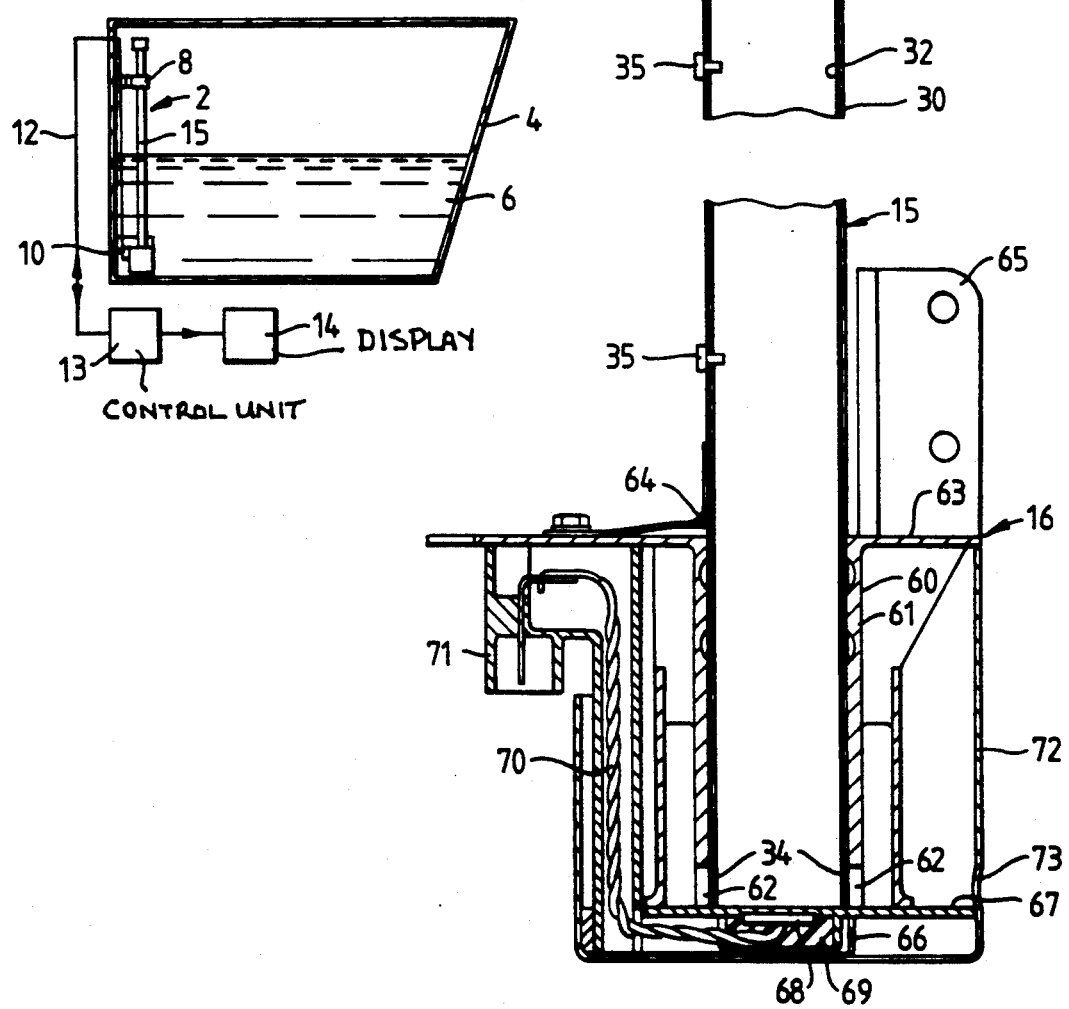

(19)

LIQUID-LEVEL GAUGING

BACKGROUND OF THE INVENTION

This invention relates to liquid-level gauging.

The invention is more particularly concerned with ultrasonic liquid-level gauging sensors.

Ultrasonic liquid-level sensors utilize the fact that ultrasonic vibrations travel freely in a liquid but are rapidly attenuated in air or other gas. If an ultrasonic transducer is mounted on the base of a liquid reservoir so that it directs energy up towards the liquid/air interface, the energy will be reflected back down to the transducer by this interface. By measuring the time taken between transmission and reception of an energy pulse, it is possible to measure the distance between the transducer and the liquid/air interface and, from this, the depth of liquid.

It is common practice for ultrasonic transducers of this kind to be mounted at the lower end of a tube that extends from the bottom to the top of the liquid reservoir. The tube is open at the bottom so that liquid fills the tube to the same depth as in the reservoir outside the tube. The tube serves several purposes. It helps isolate the transducer from other sensors or sources of interference. It also confines the ultrasonic beam, so that it is directed only at the region of the liquid surface directly above the transducer. Furthermore, the tube produces within it a region of liquid surface that is substantially damped of waves.

Another advantage arising out of the use of the tube is that it is easy to provide a reference height, by mounting some form of reflector at a known height within the tube. In this way, the transducer will receive a reflection from the liquid surface and one from the reference reflector against which the liquid height can be calibrated. This enables the ultrasonic gauging system to compensate for different liquids having different acoustic propagation properties and for temperature variations which can affect ultra-sound propagation. An example of an ultrasonic probe having a tube of this kind is described in, for example, EP 0106677.

There are various problems with existing ultrasonic liquid gauging sensors. One problem arises from the fact that, in addition to the ultra-sound energy being transmitted through the liquid within the tube, energy is also propagated within the wall of the tube itself. This can lead to propagation from the wall into the liquid, especially at locations where the tube wall is clamped for support purposes, and hence to false echoes being received by the transducer. Attempts to reduce this problem have included the use of tubes made from plastics materials which are less prone to the generation of stray echoes. This, however, causes another problem in that, because plastics are not as rigid as metals, the wall of the tube has to be relatively thick in order to produce the necessary rigidity with a consequent increase in weight. In aircraft fuel gauging applications where a dozen or more fuel gauging probes might be used, the weight can be considerable and lead to appreciable increases in operational costs.

A further difficulty with these sensors is caused where ultrasonic energy does not pass axially along the tube since this gives rise to multiple echoes, and an increase in path length with a consequent time delay. This is especially a problem where the liquid surface is not at right angles to the tube axis since a majority of the reflected signals will not pass axially along the tube. Although the signals that are reflected axially along the tube can be sufficient to enable the height of liquid to be determined, these signals can be masked by strong signals caused by multiple reflection from the wall of the tube.

BRIEF SUMMARY OF THE INVENTION

It is an object of the present invention to provide an ultrasonic liquid level sensor which can be used to alleviate at least some of these problems.

According to one aspect of the present invention there is provided an ultrasonic liquid level sensor including an ultrasonic transducer mounted towards the lower end of a tube arranged to extend upwardly and to be filled with liquid to the same height as liquid outside the tube, the tube being made of a first, rigid material and having a surface layer along a major part at least of the length of the tube that is of a second material, different from the first and that is acoustically-absorbing so as to damp the transmission of ultrasonic vibration from the wall of the tube into liquid within the tube.

In this way, it is possible to form a tube which has similar acoustic properties to one which is made entirely of a plastic material; the strength of the first material, however, enables the tube to have a thinner wall and considerably lower weight than an equivalent plastic tube.

Preferably, the first, rigid material is a metal, such as aluminum, although it may be a glass-fibre reinforced plastics. The surface layer is preferably on the inside of the tube and may be of a plastics such as a polysulphide applied as a coating to, the tube. The transducer is preferably mounted in an acoustic isolator that substantially reduces the amount of energy transmitted to and from the wall of the tube.

An ultrasonic sensor for an aircraft fuel-gauging system, in accordance with the present invention, will now be described, by way of example, with reference to the accompanying drawings.

BRIEF DESCRIPTION OF THE DRAWINGS

FIG. 1 is a side elevation view of the sensor in an aircraft fuel tank; and

FIG. 2 is an enlarged sectional side elevation view of the sensor;

DETAILED DESCRIPTION OF PREFERRED EMBODIMENT

With reference to FIG. 1, the sensor 2 is mounted vertically in a tank 4 of an aircraft containing liquid fuel 6. The sensor 2 is supported by two clamps 8 and 10 which are secured to the upper and lower end of the sensor respectively and to the wall of the tank 4. The drive signal to the sensor and its electrical output are taken from the lower end of the sensor via a cable 12 to a control unit 13 including a fuel gauging computer which computes the volume of fuel from the height information provided by the sensor and from knowledge of the tank shape. The output from the control unit 13 is supplied to a display 14, or other utilization means, which may be in terms of either volume or mass if a density input is provided.

With reference now also to FIG. 2, the sensor 2 comprises a tubular assembly 15 and a base assembly 16 mounted at the lower end of the tubular assembly.

The tubular assembly 15 is about 530 mm long and has an external diameter of about 25 mm. The assembly is made up from a cylindrical tube 30 of metal, such as aluminum, which has a wall thickness of about 0.5 mm and a coated layer 32 on its inside of an acoustically-absorbing plastics material such as a two-part polysulphide or similar plastics material. The thickness of the layer 32 is not critical and is typically about equal to the wall thickness of the tube 30, being between about 0.4 to 0.5 mm. The layer of acoustically-absorbing material could instead be applied to the outside of the tube although the improvement this produces is not as great as for an internal layer. The coating can be carried out by any conventional technique such as by pouring the coating material in a liquid form though the tube. At its upper end, the assembly 15 is closed by a metal cap 33 soldered to the tube 30. At its lower end, the assembly 15 is open to fuel within the tank 4 through four equally-spaced slots 34 around the lower end of the tube 30. One or more reference reflectors 35 extend through the wall of the tubular assembly 15 at points along its length.

The base assembly 16 includes an inner support structure 60 with a tubular sleeve 61 that embraces the lower end of the tube 30, the sleeve having slots 62 that align with the slots 34 in the tube. At its upper end, the support structure 60 has a radially-extending flange 63. On one side, this is secured with the tube 30 by means of a metal strap 64 which is brazed to the outside of the tube at one end and is bolted to the flange 63 at its other end. A mounting bracket 65 projects vertically from the flange 63, this being attached to the clamp 10 at the lower end of the sensor. At the lower end of the base assembly 16 there is a transducer assembly 66 which comprises a mounting plate 67 and an ultrasonic transducer 68 potted onto the underside of the plate with an acoustically-absorbing plastics 69 such as polysulphide. The transducer 68 is positioned on the axis of the tube 30 and its wires 70 extend into a terminal block 71, the hollow space around the wires being potted with a plastics material that is slightly conductive electrically, such as a polysulphide with a dispersed conductive powder. This provides a safety leakage path with a resistance of the order of several thousand ohms to prevent charge built-up in the event of damage to the sensor 2. The mounting plate 67 is of a plastics material such as polyphenylene sulphide and its thickness is such that it enables the axial beam of energy from and to the transducer to pass through the plate without substantial attenuation. The plastics material of the plate 67, however, with the potting material 69, acts as an acoustic isolator, isolating the transducer from the tubular assembly 15.

The base assembly 16 is completed by a cylindrical outer cover 72 which encloses the structure 60 and the transducer assembly 66. Apertures 73 towards the lower end of the cover 72 allow fuel to flow into and out of the base assembly 16, and hence, into and out of the tubular assembly 15.

In use, the control unit 13 energizes the transducer 68 with electrical pulses that cause the transducer to emit ultrasonic energy pulses with a frequency of about 1 MHz and a pulse repetition frequency of about I second. The ultrasonic energy is directed vertically upwards, along the axis of the tubular assembly 15.

Each pulse of ultrasonic energy travels axially up the assembly 15 within the fuel 6 until it meets the interface with the air or gas in the tank 4 above the fuel. At this point the energy pulse is reflected downwardly back to the transducer 68. The transducer 68 will also receive an echo pulse arising from reflection from the reflectors 35. These echo pulses provide calibration pulses against which the echo from the liquid surface can be calibrated. The coating 32 on the inside of the assembly 15 reduces considerably both the amount of energy transferred to the tube 30 from the fuel within the tube and the amount of energy transferred from the tube to the fuel. This leads to a considerably cleaner output signal, that is, one with far less spurious noise than would be produced by a metal tubular assembly that did not have a similar coating. It has not been possible previously to use metal tubes because of the high noise levels. The performance of tubes made from other rigid materials such as a rigid glass-fibre reinforced plastic can also be improved by coating with a different, acoustically-absorbing material. More particularly, a tubular assembly may be made of a resin-impregnated glass-fibre strip, such as Fiberite from ICI Fiberite in California, USA, wound onto a polybutadiene tube, such as Buna CB made by Bayer AG of Leverkusen, Germany. After curing, the glass-fibre provides a rigid outer structure with the polybutadiene tube providing an elastic, acoustically-absorbing inner layer.

Because the plastics material surrounding the transducer 68 is of an acoustically-absorbing material, it acts to isolate the transducer from the tubular assembly 15. This reduces further the amount of energy propagated from the transducer 68 into the tube wall and hence reduces both the external interference caused by the sensor to other sensors and the amount of energy propagated into the fuel within the sensor from the wall.

What I claim is:

1. In an ultrasonic liquid level sensor of the kind including an ultrasonic transducer mounted towards the lower end of a tube so that ultrasonic energy from the transducer is directed upwardly along the length of the tube to a liquid/gas interface at which energy is reflected back to the transducer, said tube being mounted in a liquid reservoir and arranged to extend upwardly and to be filled with liquid to the same height as liquid outside the tube, the improvement wherein the tube is of a first, rigid material and has a surface layer along a major part at least of the length of the tube that is of a second material different from the first material, the second material being acoustically-absorbing and functioning to absorb ultrasonic energy and thereby damp the transmission of ultrasonic vibration from a wall of the tube into liquid within the tube.

2. A sensor according to claim 1, wherein the first, rigid material is a metal.

3. A sensor according to claim 2, wherein the metal is aluminum.

4. A sensor according to claim 1, wherein the first material is of glass-fibre reinforced plastics.

5. A sensor according to claim 1, wherein the surface layer is on the inside of the tube.

6. A sensor according to claim 1, wherein the second material is a plastics material.

7. A sensor according to claim 6, wherein the plastics material is a polysulphide.

8. A sensor according to claim 1, wherein the second material is -applied as a coating.

9. A sensor according to claim 1 including an acoustic isolator, and wherein the transducer is mounted in the acoustic isolator so that the amount of energy transmitted to and from the wall of the tube is substantially reduced.

10. An ultrasonic liquid level sensor comprising: an ultrasonic transducer; means mounting a tube in a liquid reservoir with the tube extending upwardly so that the tube is filled with liquid to the same height as liquid in the reservoir outside the tube; and means mounting the transducer at the lower end of the tube so that ultrasonic energy form the transducer is directed upwardly along the length of the tube to a liquid/gas interface at which energy is reflected back tot he transducer, the tube being of a metal and having an internal layer of an acoustically-absorbing plastics material that absorbs ultrasonic energy and thereby damps transmission of ultrasonic vibration from a wall of the tube into liquid within the tube.

* * * * *